April 7, 1959 E. G. JOHNSON 2,880,893
LOGGING SLED
Filed July 25, 1957
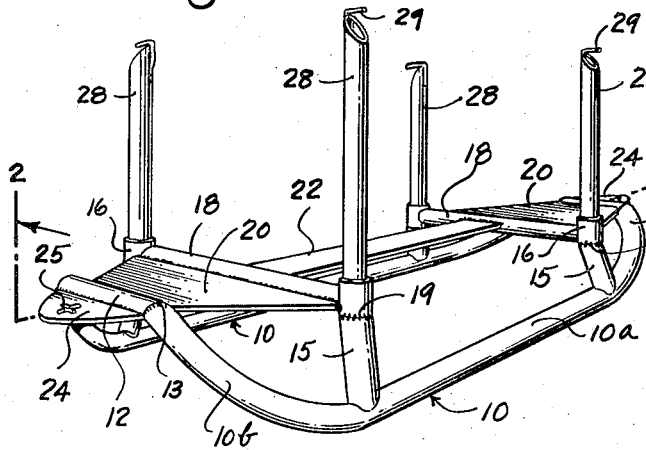
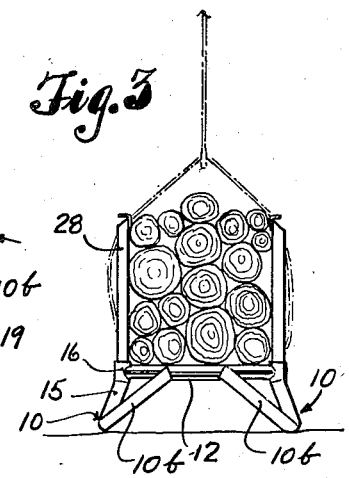
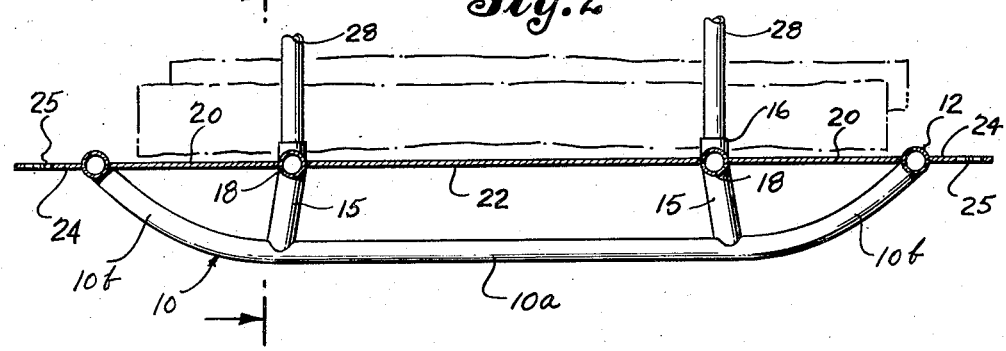
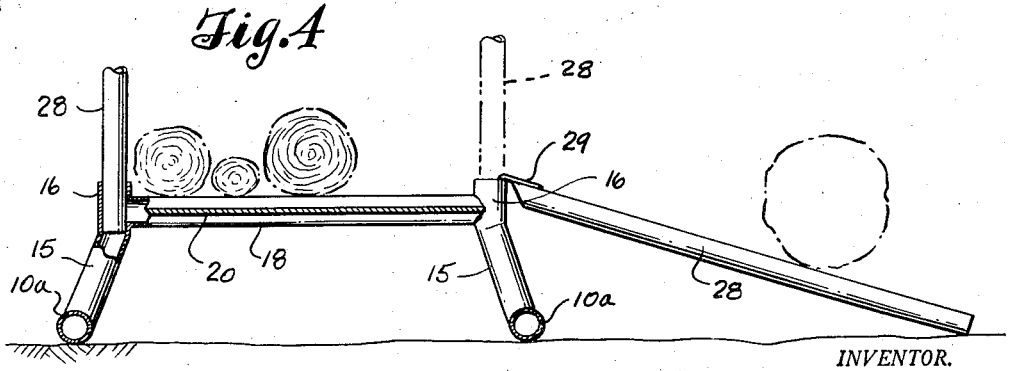
INVENTOR.
EARL G. JOHNSON
BY Robinson & Berry
ATTORNEYS

United States Patent Office 2,880,893
Patented Apr. 7, 1959

2,880,893

LOGGING SLED

Earl G. Johnson, Bothell, Wash.

Application July 25, 1957, Serial No. 674,250

2 Claims. (Cl. 214—85)

This invention relates to a vehicle which, for the purpose of this application, will be designated as a "logging sled." More particularly it has reference to a load hauling vehicle of sled form that is especially adapted for the bundling and hauling of pulp wood logs, or the like, from timbered areas.

It is the principal object of this invention to provide a sled or dray of the kind and especially adapted for the purpose above stated, which is so designed that it will not, in being moved through a wooded area, cause damage to standing timber by contact therewith. Furthermore, to provide a sled that has ample clearance for passing over low cut stumps.

Another object of the invention is to provide a sled of the present character on which the logs or pieces assembled therein are positioned for easy bundling and for lifting as a unit therefrom.

Yet another object of the invention is to provide a sled of exceptionally sturdy construction; that is double ended to adapt it for travel in either direction; which comprises relatively few parts in its construction and can be easily and readily connected entrain with others of a like kind.

Still further objects and advantages reside in the details of construction and combination of the various parts of the vehicle and in their assembled relationship and mode of use as hereinafter disclosed.

In accomplishing the above mentioned and other objects of the invention, I have provided the improved details of construction, the preferred forms of which are illustrated in the accompanying drawings, wherein Fig. 1 is a perspective view of a sled embodying the improvements of the present invention therein.

Fig. 2 is a central longitudinal sectional view of the sled; the section being taken on line 2—2 in Fig. 1.

Fig. 3 is an end view of the sled as loaded.

Fig. 4 is a cross-sectional view taken on line 4—4 in Fig. 1, with certain parts broken away to show the bolster mounting.

Referring more in detail to the drawings—

The present vehicle, which will be referred to as a "sled," is symmetrical in the arrangement of its various parts at opposite sides of its central longitudinal plane and also at front and rear sides of a central transverse plane. It comprises paired and coextensive opposite side runners 10—10; each having a rather elongated and horizontally disposed medial portion 10a and having upwardly and inwardly curved opposite end portions 10b—10b; these latter parts of the paired runners being joined at the opposite ends of the sled by short, horizontal and transversely directed connecting members 12.

The runners 10—10 are made of single lengths of metal tubing, of uniform diameter from end to end, and the connecting portions 12 are of tubing of like kind and diameter; the parts being permanently joined by welding, as at 13, to provide a rigid frame and sled runner construction.

Welded to the runners 10—10 at the opposite ends of the horizontal medial portions thereof, are tubular posts 15, these all being of the same height and inclined inwardly toward the central plane of the sled to equal extent. At the upper end of each post 15, a short tubular extension portion 16 of the same diameter is welded thereto. These extension portions are virtually extended and are open at their upper ends. Extended horizontally between the corresponding extension pieces 16 are tubular bunks 18; these being welded at their ends to the extensions as indicated at 19. It has been shown in Fig. 2 that the two bunks 18 and the two connectors 12 at opposite ends of the sled, are disposed in the same horizontal plane.

Disposed between each of the bunks 18 and the connector piece 12 at the corresponding end of the sled, is a flat plate 20; these plates being welded along their front and rear edges to the parts 12 and 18, thus to give the sled structure additional rigidity. Extended between the two bunks, in the central line of the sled is a flat tie plate 22; this being horizontally disposed and welded at its ends to the cross-bunks.

Welded to the two cross-connectors 12, along what will be designated as their outer sides, and as shown best in Fig. 2, are metal plates 24, each being disposed in the horizontal plane of the axial line of the piece 12 to which it is attached. These plates have forwardly curved outer edges, as shown in Fig. 1, and each plate is formed at a point in the center plane of the sled, with a key hole 25 for the reception of a chain, or the like, as a means for joining the sled entrain with others of like kind, or for drawing it as from a tractor.

In order to support a load or bundle on the sled it is equipped with side stakes or bolsters 28. Each of these is a straight tubular length of pipe that is telescopically received and fitted at its lower end in one of the extension pieces 16. The stakes, as will be observed in Fig. 4, are held vertically and are inset from the vertical planes of the medial portions of the runners. Stakes are of equal length and are cut on a bevel at their upper ends, as shown in Figs. 1 and 3, and each is equipped at the high point of the bevel with an inturned hook 29, as best shown in Figs. 1 and 4; these hooks being for a purpose presently explained.

Assuming the sled to be so constructed, it can be tractor drawn through a timbered area without causing rubbing damage to standing trees; it has ample underside clearance to permit it to pass over low cut stumps. The load that may be placed thereon between the stakes 28, as seen in Fig. 3, will not catch on trees in passing because of the inset relationship of stakes to the medial portions of the runners.

The sled is of exceptionally sturdy construction; free of any loosely joined or relatively movable parts except the stakes which may be withdrawn to aid in unloading or loading. When stakes are withdrawn at one side, they may be applied as skids by engaging the hooks 29 at their upper ends with the open end of the pieces 16 from which they were withdrawn as has been illustrated in Fig. 4.

Loads or bundles of logs may be readily lifted as a unit from the sled by applying slings about their opposite end portions and then lifting through the mediacy of a spreader bar applied to the slings as shown in Fig. 3.

What I claim as new is:

1. A sled of the character described comprising paired, opposite side runners, formed from single lengths of tubular pipe, with their opposite end portions curved upwardly and inwardly to a common level; the corresponding ends of said runners being rigidly joined by interposed, horizontal pipe sections, each of said runners having upwardly directed and inwardly inclined posts of tubular form fixed rigidly thereto near its opposite ends and extended to the level of the joined ends of the runners, said posts being located in transversely aligned relationship, horizontal bunks extended between and fixed to the upper end portions of paired posts, bolsters removably applied to the upper ends of the posts, web plates fixed to and extended horizontally between the bunks and the adjacent interposed horizontal pipe sections which join the ends of the runners, a tie strap extended between and fixed to the bunks, and draft plates fixed to said interposed pipe sections which join the ends of the runners.

2. The device of claim 1 wherein said bolsters are equipped with hooks at their upper ends which, upon removal of the bolsters from the posts, may be hooked into the open ends of the posts thus to support the bolsters for use as loading or unloading skids.

References Cited in the file of this patent

UNITED STATES PATENTS

| | | |
|---|---|---|
| 1,411,429 | Gosmeyer | Apr. 4, 1922 |
| 1,566,610 | Leblanc | Dec. 22, 1925 |
| 2,256,623 | Newman | Sept. 23, 1941 |
| 2,370,427 | Sherry | Feb. 27, 1945 |
| 2,665,020 | Whittle | Jan. 5, 1954 |

FOREIGN PATENTS

| | | |
|---|---|---|
| 555,997 | Germany | Aug. 4, 1932 |